United States Patent
Mathias et al.

(10) Patent No.: US 10,533,455 B2
(45) Date of Patent: Jan. 14, 2020

(54) ASSEMBLY OF TWO PARTS COMPRISING A REMOVABLE CENTRING SEAT FOR AN AIRCRAFT TURBINE ENGINE

(71) Applicant: SAFRAN AIRCRAFT ENGINES, Paris (FR)

(72) Inventors: Cyrille Francois Antoine Mathias, Livry Gargan (FR); Julien Vitra, Brunoy (FR); Herve Simonotti, Villiers sur Marne (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 277 days.

(21) Appl. No.: 15/516,710

(22) PCT Filed: Oct. 9, 2015

(86) PCT No.: PCT/FR2015/052722
§ 371 (c)(1),
(2) Date: Apr. 4, 2017

(87) PCT Pub. No.: WO2016/055747
PCT Pub. Date: Apr. 14, 2016

(65) Prior Publication Data
US 2017/0298775 A1 Oct. 19, 2017

(30) Foreign Application Priority Data
Oct. 10, 2014 (FR) ...................................... 14 59754

(51) Int. Cl.
*F16B 5/02* (2006.01)
*F01D 25/24* (2006.01)
(Continued)

(52) U.S. Cl.
CPC .............. *F01D 25/243* (2013.01); *F16B 5/02* (2013.01); *F16B 21/186* (2013.01); *F16B 2043/008* (2013.01)

(58) Field of Classification Search
CPC .............. F01D 25/243; F16B 2043/008; F16B 21/186; F16B 5/02; F16B 37/122;
(Continued)

(56) References Cited

U.S. PATENT DOCUMENTS 2,640,244 A    6/1953  Becker
2,853,112 A    9/1958  Poupitch
(Continued)

FOREIGN PATENT DOCUMENTS

DE    4310002 C1    4/1994
EP    2 653 376 A1    10/2013
FR    2 968 039 A1    6/2012

OTHER PUBLICATIONS

International Search Report dated Jan. 18, 2016 in PCT/FR2015/052722 filed Oct. 9, 2015.
(Continued)

*Primary Examiner* — Daniel J Wiley
(74) *Attorney, Agent, or Firm* — Oblon, McClelland, Maier & Neustadt, L.L.P.

(57) ABSTRACT

A turbine engine for an aircraft which includes, in general, at least one assembly made up of a first part wherein a second part is attached with an attachment device including a milled head applied to the first part and a body engaging with the second part in order to clamp the parts. The recess of the head of such an attachment device requires a boss on the first part, which is complex and expensive to produce using conventional techniques. Such a boss can be replaced with a removable seat having an opening through which the body passes and forming a recess for the head, a bearing (Continued)

surface for the head, and abutment device applied to the first part in order to prevent a movement of the seat towards the second part.

11 Claims, 4 Drawing Sheets

(51) Int. Cl.
  *F16B 21/18* (2006.01)
  *F16B 43/00* (2006.01)
(58) Field of Classification Search
  CPC .... F16B 37/125; F16B 5/0208; F16B 5/0241; F16B 5/0258; F16B 5/065; B64C 1/12; B64C 1/18; B64C 3/26; B64C 3/28; B64C 3/34; B64D 45/02; Y10T 403/645; Y10T 403/75
  USPC .............................................. 403/337, 408.1
  See application file for complete search history.

(56) References Cited

U.S. PATENT DOCUMENTS

| | | | | |
|---|---|---|---|---|
| 3,614,799 | A | 10/1971 | Gulistan | |
| 3,835,615 | A * | 9/1974 | King, Jr. | B23P 9/025 403/408.1 |
| 4,817,264 | A * | 4/1989 | Worthing | F16B 5/01 29/512 |
| 5,175,665 | A * | 12/1992 | Pegg | B64D 45/02 244/1 A |
| 5,462,395 | A | 10/1995 | Damm et al. | |
| 10,329,958 | B2 * | 6/2019 | Beljambe | B64D 29/06 |
| 10,393,158 | B2 * | 8/2019 | Boedot | F16B 5/0208 |
| 2001/0014253 | A1 * | 8/2001 | Shiokawa | F16B 37/122 403/408.1 |
| 2013/0236291 | A1 | 9/2013 | Decerle et al. | |
| 2013/0280008 | A1 | 10/2013 | Sanz Torrijos et al. | |
| 2016/0215804 | A1 * | 7/2016 | Hufnagl | F16B 5/0258 |
| 2017/0369149 | A1 * | 12/2017 | Walker | B64C 3/26 |
| 2018/0029688 | A1 * | 2/2018 | Connelly | B64C 1/40 |

OTHER PUBLICATIONS

French Search Report dated Aug. 14, 2015 in FR 1459754 filed Oct. 10, 2014.

* cited by examiner

ASSEMBLY OF TWO PARTS COMPRISING A REMOVABLE CENTRING SEAT FOR AN AIRCRAFT TURBINE ENGINE

TECHNICAL DOMAIN

This invention relates to the domain of machines such as aircraft turbine machines, and most particularly relates to the assembly of two parts that will form part of such a machine.

STATE OF PRIOR ART

A turbine machine for an aircraft usually comprises parts in the form of relative thin walls onto which other parts are fixed by means of screws, rivets or similar attachment means with countersunk heads.

These relatively thin parts are for example sectors mounted circumferentially end-to-end to form an outer shell of a hub of an intermediate case delimiting the inner boundary of the turbine machine fan flow channel, and/or an inner shell of such a hub of an intermediate case delimiting the outer boundary of the turbine machine engine core flow channel. Components housed in a space defined between the above-mentioned two shells are fixed to one of the two shells. Components fixed to these relatively thin parts include for example air or oil routing conduits. Furthermore, relatively thin walls are usually themselves fixed to the casings, also by attachment means of the type described above.

In general, countersunk heads of attachment parts cannot fit into the thickness of these relatively thin walls. Consequently, such a relatively thin wall is provided with bosses to be able to hold the head of each attachment means.

FIG. 1 diagrammatically illustrates a first relatively thin part 10 such as a shell sector of the type described above onto which a second part 12 is fixed in a known manner.

This is done by providing the two parts 10 and 12 with a first through orifice 14 and a second through orifice 16 facing each other, through which a screw 18 extends comprising a threaded body 19 screwed into threaded means 20 fixed onto or built into the second part 12.

The first part 10 is fitted with a boss 22 in which a recess 24 is formed to hold the screw head 26. Such a boss thus prevents the head 26 of the screw from projecting outwards from the first part 10.

However, the construction of such bosses requires the use of complex machining techniques that are expensive to implement.

PRESENTATION OF THE INVENTION

The main purpose of the invention is to provide a simple, economic and efficient solution to this problem.

To achieve this, it discloses an assembly, particularly for a machine such as an aircraft turbine machine, comprising a first part with a first through orifice, a second part with a second through orifice facing the first through orifice in the first part, and an attachment means that passes through said first and second through orifices, and that has a head in the shape of a countersunk head that bears on the first part and a body cooperating with the second part so that the attachment means fix the second part on the first part.

According to the invention, the assembly comprises a seat, independent of the first and second parts and the attachment means. This seat is mounted in the first through orifice, and the seat comprises:

a first axis, defined relative to the second part, for positioning the attachment means, a seat orifice in which the head of the attachment means is housed and through which the body of the attachment means extends, a countersunk bearing surface extending in the first through orifice and in the second through orifice, and onto which the head of the attachment means is applied, and abutment means cooperating with a periphery of the first through orifice to prevent a displacement of the seat towards the second part.

The assembly also has the following characteristics:

said seat orifice defines a second axis, the bearing surface is configured to centre the head of the attachment means relative to said second axis, the first part is spot faced, the bottom of the spot facing forming the periphery of the first through orifice, and the seat comprises an outer lateral surface in the shape of a cylinder of revolution, installed to fit in said first through orifice such that said first and second axes are coincident.

The bearing of the head of the attachment means on the first part is thus applied through said abutment means.

Therefore the invention discloses that the head of the attachment means can be housed in seats independent of the parts to be assembled, and therefore removable. The invention thus avoids the use of expensive and complex machining techniques.

The invention is applicable to all types of parts to be assembled but is particularly advantageous when the first part is relatively thin, particularly in the case in which it is impossible to house the head of a screw, rivet at similar attachment means within the thickness of the first part. Thus, the bearing surface extends in the first through orifice and in the second through orifice. This means that the head of the attachment means does not project beyond the first part on the side opposite the second part, but extends jointly within the thickness of the first and the second parts.

The seat enables reciprocal centring of the attachment means and the first part relative to the first axis. Due to the fitted installation of the seat in the first orifice, the invention thus enables optimum relative positioning of the first part relative to the second part.

Furthermore, the attachment means is preferably a screw, and the second part is advantageously provided with threaded means defining said first axis, the latter thus forming a screwing axis for the screw.

Said abutment means are also advantageously in the form of an annular rim extending around the seat projecting outwards from the seat. The annular rim may possibly project from the outer lateral surface of the seat.

Preferably, the assembly also comprises an axial stop device cooperating with the seat and with the first part to retain the seat in the first through orifice.

The axial stop device can prevent the seat from moving in the direction opposite to the second part. This device and the above-mentioned abutment means thus jointly retain the seat on the first part. This minimises risks of the seat getting lost during assembly operations of the two parts.

Preferably, the seat comprises a first annular groove, and the axial stop device comprises a removable locking device engaged in said first annular groove.

The axial stop device can thus be installed after the seat has been assembled in the first through orifice, while its design remains simple.

The removable locking device is preferably in the form of a stop ring.

In a first preferred embodiment of the invention, the second part has a contact surface applied in contact with the first part, said second through orifice comprises a widened part opening up through said contact surface, and a part of the seat extends in said widened part of the second through orifice.

In a second preferred embodiment of the invention, the assembly also comprises a spacer inserted between said first and second parts and surrounding part of the seat.

Preferably, the spacer comprises a second annular groove in which said removable locking device is partially engaged, such that the spacer and the seat mutually retain each other to the first part.

The invention also relates to a machine, particularly a turbine machine, comprising at least an assembly of the type described above, in which either the first or the second part forms at least part of an annular wall delimiting a flow channel of the machine.

Preferably, the other of the first and second parts forms at least part of a structural case of the machine or a part of a conduit for the circulation of a fluid.

Finally, the invention relates to a method of making an assembly of the type described above, including the following steps:
 put the seat into place in the first through orifice of the first part;
 put the second part into place, such that the second through orifice is positioned facing the first through orifice;
 put the attachment means into place through the first and second through orifices, until a compression stress is applied between the first and the second parts and the first part and the second part are clamped to each other, due to pressure applied by the head of the attachment means on the first part and due to cooperation between the body of the attachment means and the second part.

Preferably, the method also comprises a step consisting of activating an axial stop device such that said device cooperates with the seat and with the first part to retain the seat in the first through orifice.

BRIEF DESCRIPTION OF THE DRAWINGS

The invention will be better understood and other details, advantages and characteristics of it will become clear after reading the following description given as a non-limitative example with reference to the appended drawings in which.

In all these figures, identical references may denote identical or similar elements.

DETAILED PRESENTATION OF PREFERRED EMBODIMENTS

Figure 1:
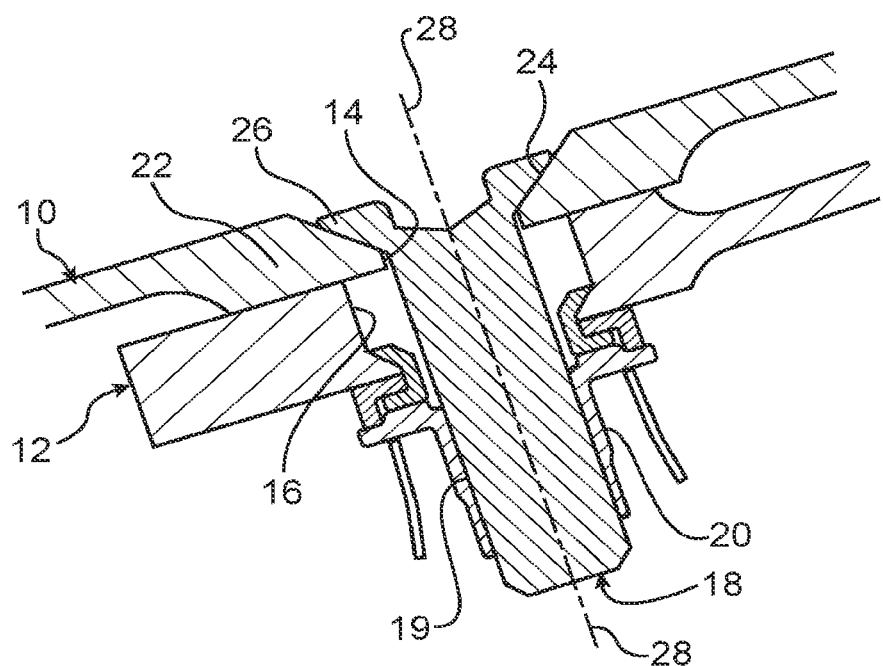
FIG. 1, already described, is a diagrammatic axial partial sectional view of an assembly of two parts of a known type.
Figure 2:
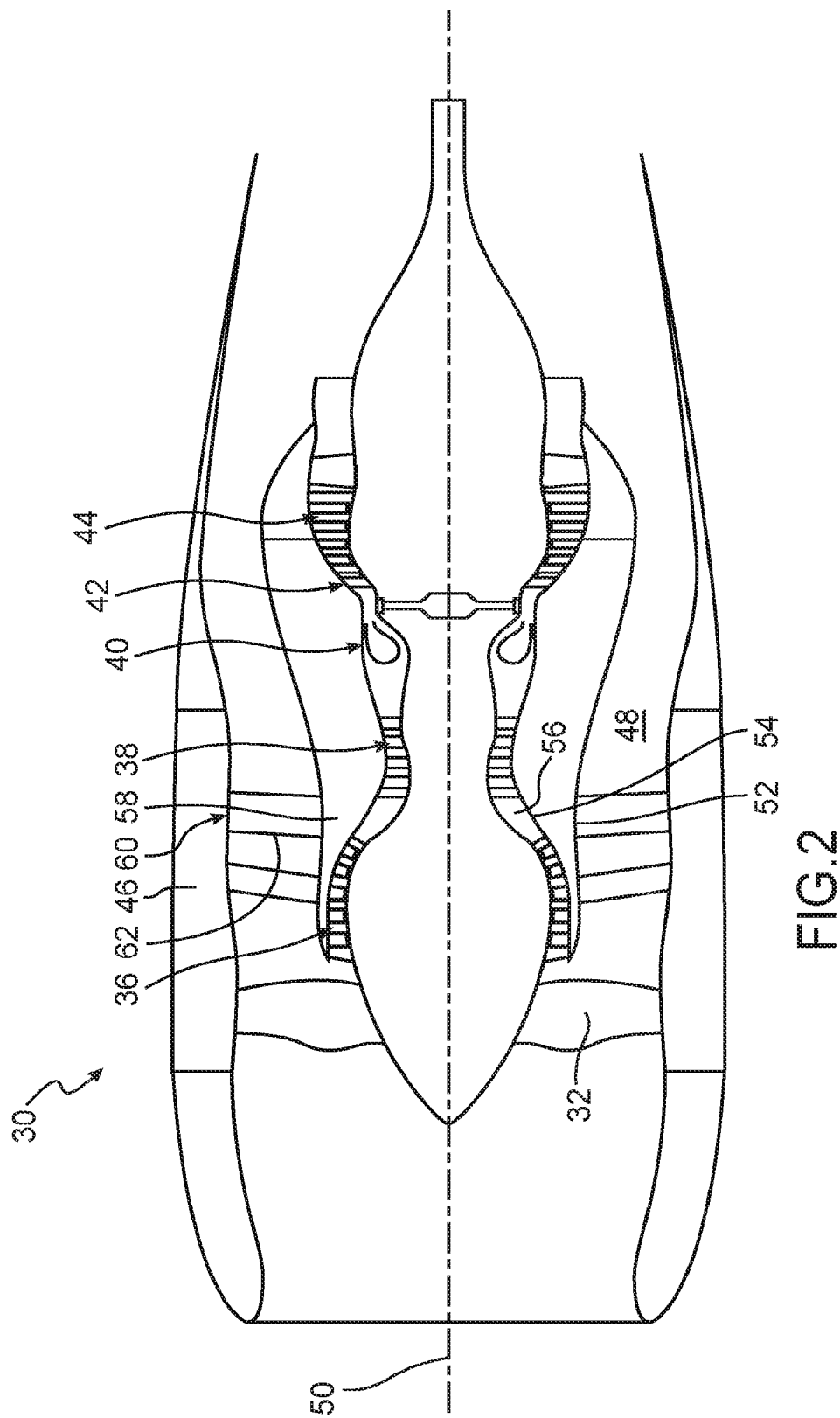
FIG. 2 is a diagrammatic axial sectional view of a turbine machine for aircraft according to a preferred embodiment of the invention.

FIG. 2 illustrates a turbine machine for an aircraft 30, for example a twin spool turbojet comprising in general a fan 32 that will draw in an airflow dividing downstream from the fan into a core engine flow supplying the core of the turbine machine and a fan flow bypassing this core 34. This core comprises in general a low pressure compressor 36, a high pressure compressor 38, a combustion chamber 40, a high pressure turbine 42 and a low pressure turbine 44. The turbine machine is surrounded by a nacelle 46 surrounding the flow space 48 of the fan flow. The turbine machine rotors are installed free to rotate about a longitudinal axis 50 of the turbine machine.

The turbine machine 30 comprises particularly parts in the form of relative thin walls onto which other parts are fixed by means of screws, rivets or similar attachment means.

This consists particularly of sectors mounted end-to-end circumferentially to form the outer shell 52 of a hub of the intermediate case, delimiting the inner boundary of the fan flow space 48, and sectors installed end-to-end circumferentially to form the inner shell 54 of such a hub of the intermediate case, this shell 54 delimiting the outer boundary of the engine core flow space 56. Components (not visible on FIG. 2) housed in the space 58 defined between the two shells 52 and 54 are fixed to one of these two shells. Furthermore, these shells themselves are fixed onto an intermediate case 60 of the turbine machine, for example structural struts 62 forming part of this case.

Figure 3:
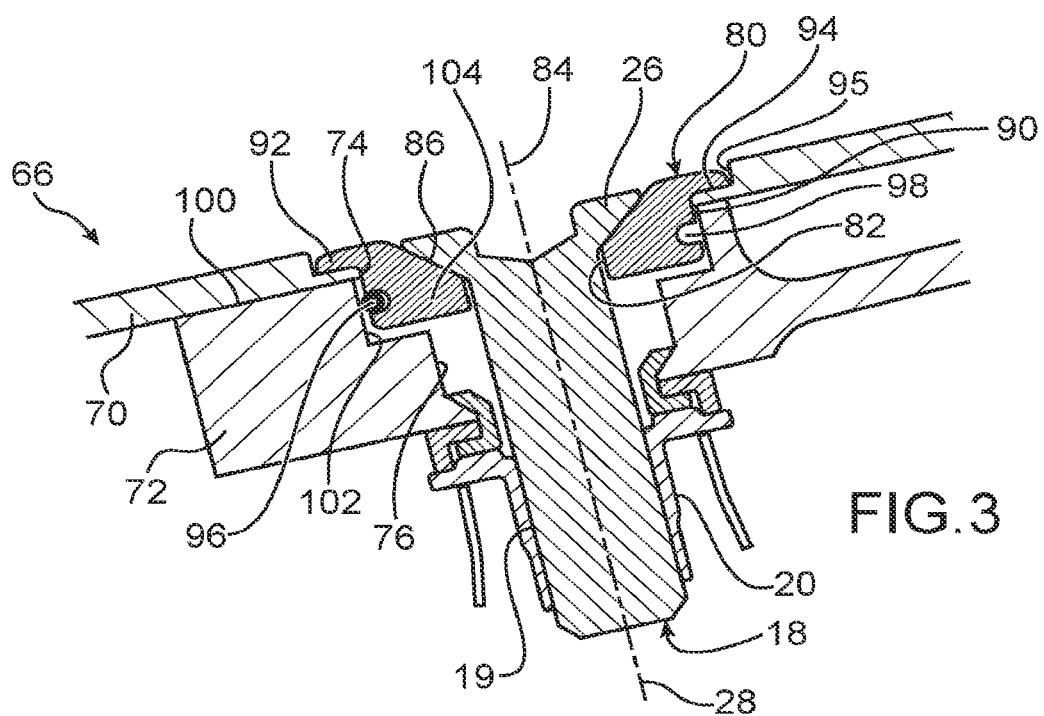
FIG. 3 is a partial diagrammatic axial sectional view of an assembly of two parts according to a first preferred embodiment of the invention, that will equip the turbine machine in FIG. 2.

FIG. 3 illustrates an assembly 66 according to a first preferred embodiment of the invention, comprising a first part 70 that is for example a sector of the outer shell 52, and a second part 72, that is for example a wall of an air or oil flow transfer conduit. As a variant, the second part 72 may in particular be a part of a structural strut 62 of the intermediate case.

The two parts 70 and 72 are provided with a first through orifice 74 and a second through orifice 76 positioned facing the first through orifice 74.

An attachment means 18 extends through the two through orifices 74, 76. This attachment means 18 has a countersunk head 26 that will apply pressure on the first part 70 and a body 19 designed to cooperate with the second part such that the attachment means 18 attaches the second part onto the first part.

Moreover, a first axis 28 for positioning the attachment means is defined relative to the second part 72.

In the example illustrated, the attachment means is in the form of a screw 18. The above-mentioned head 26 forms the head of the screw while the body 19 comprises the thread of the screw. Moreover, the first axis 28 is a screwing axis defined by retaining means such as threaded means 20 fixed onto the second part 72 along the extension of the second through orifice 76, in a manner known in itself.

The assembly 66 also comprises a seat 80, forming a part independent of the first and second parts 70, 72 mentioned above and the attachment means 18. Therefore the seat 80 is removable.

The seat 80 has a seat orifice 82, for example at its centre, in which the head 26 of the attachment means is housed and through which the body 19 of the attachment means extends. The seat 80 also comprises a bearing surface 86 delimiting an entry section of the seat orifice 82 and onto which the head 26 of the attachment means 18 is applied. The bearing surface 86 is countersunk and extends into the first through orifice 74 and into the second through orifice 76, in other words into at least part of the thickness of each of the first and second parts. The head 26 can thus have an axial extent larger than the thickness of the first part 70, while remaining housed jointly in the thickness of the two parts 70 and 72 such that the head 26 does not project significantly from the first part 70 on the side opposite the second part 72.

The seat orifice 82 defines a second axis 84, and the bearing surface 86 is conformed to centre the attachment means 18 along the second axis 84.

The seat 80 has a external lateral surface 90 installed to fit in the first through orifice 74, such that the second axis 84 is coincident with the first axis 28. The external lateral surface 90 and the first through orifice 74 are in the form of a cylinder of revolution.

The seat 80 also comprises abutment means 92 cooperating with a periphery of the first through orifice 74 to prevent a displacement of the seat 80 towards the second part 72. The bearing of the head 26 of the attachment means 18 on the first part 70 is thus applied through said abutment means 92 of the seat.

In the example shown, the abutment means are in the form of an annular rim 92, or a collar, extending around the orifice of the seat 82, projecting radially outwards from the seat, from the external lateral surface 90. This annular rim 92 is applied around the periphery 94 of the first through orifice 74. The first part 70 is provided with spot facing 95 with a bottom forming the periphery 94 of the first through orifice 74 on which the annular rim 92 is applied. In the example illustrated, the annular rim 92 is entirely housed inside the spot facing 95. As a variant, the annular rim 92 can project outside the spot facing 95, above the surface of the first part 70, without going outside the framework of the invention.

The assembly 66 also preferably comprises an axial stop device comprising a removable blocking device 96 cooperating with the seat 80 and with the first part 70 to retain the seat 80 in the first through orifice 74.

In the example illustrated on FIG. 3, the seat 80 comprises a first annular groove 98 formed in the lateral outer surface 90 of the seat, and the removable blocking device is a stop ring 96 engaged in the first annular groove 98. More precisely, a radially inner annular portion of the stop ring 96 is housed in the first annular groove 98 while a radially outer annular portion of the stop ring 96 projects outside the first annular groove so as to form an abutment relative to the periphery of the first through orifice 74, preventing a displacement of the seat 80 in the direction from the second part 72 towards the first part 70. In the example illustrated, the abutment formed by the stop ring 96 is not active in the clamped position of the two parts visible on FIG. 3, but nevertheless prevents the seat 80 from dissociating from the first part 70 during assembly operations of the two parts 70 and 72.

In the first preferred embodiment of the invention, the second part 72 has a contact surface 100 applied in contact against the first part 70, the second through orifice 76 comprises a widened part 102 opening up through the contact surface 100, and a part 104 of the seat 80 extends axially in the widened part 102 of the second through orifice.

In this first embodiment, the seat 80 is thus partially housed in the second through orifice 76 of the second part 72.

The assembly according to the first preferred embodiment of the invention can be made by steps consisting of the following in sequence:

put the seat 80 into place in the first through orifice 74 in the first part 70; in the example illustrated, this step includes inserting the annular rim 92 into the spot facing 95;

activate the axial stop device 96; in the example illustrated, this step includes inserting the radially inner annular portion of the stop ring 96 into the first annular groove 98; this optional stop assures that the seat 80 is "captive", in other words prevents it from accidentally getting separated during the next step;

put the second part 72 into place, possibly fitted with threaded means 20, such that the contact surface 100 of the second part 72 is applied in contact with the first part 70 and that the second through orifice 76 is facing the first through orifice 74;

activate cooperation of the body 19 of the attachment means 18 with the second part 72 until a compression stress is applied between parts 70 and 72 and the two parts 70, 72 are clamped; in the example illustrated, the screw 18 is screwed into the threaded means 20 while passing through the first through orifice 74.

Figure 4:
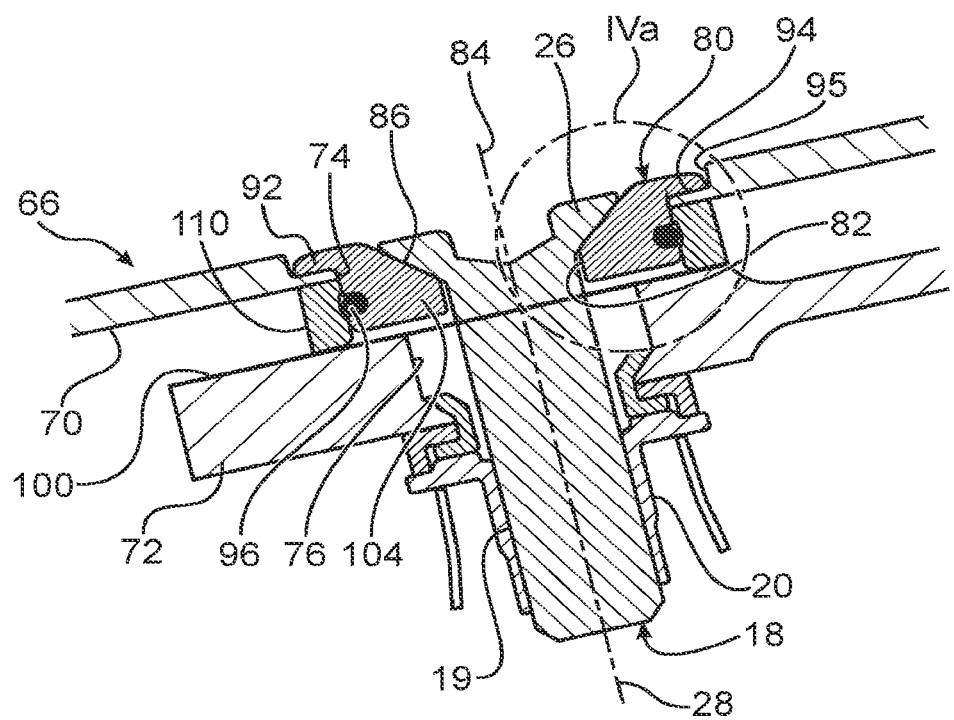
FIG. 4 is a partial diagrammatic axial sectional view of an assembly of two parts according to a second preferred embodiment of the invention, that will equip the turbine machine in FIG. 2.

In the second preferred embodiment of the invention that can be seen on FIG. 4, the assembly 66 also comprises a spacer 110 inserted between the first part 70 and the second part 72. The spacer 110 surrounds part of the seat 80. More precisely, the spacer 110 is approximately in the form of a ring, or a cylinder of revolution, installed to fit around the outer lateral surface 90 of the seat.

Figure 4A:
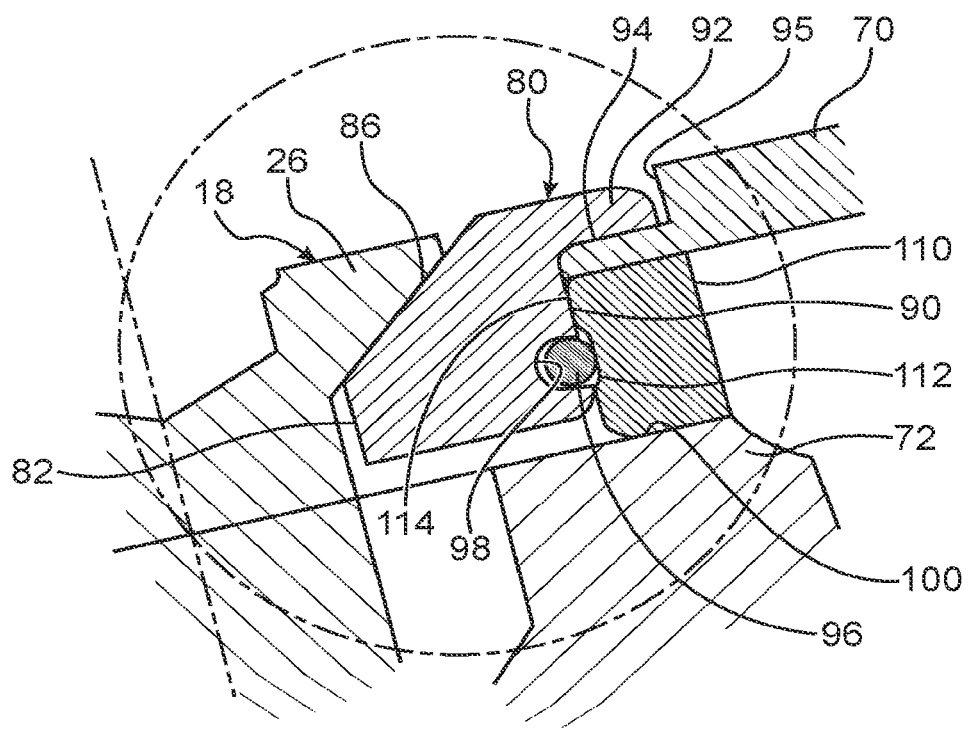
FIG. 4a is a larger scale view of part IVa in FIG. 4.

In the example illustrated on FIG. 4, the assembly comprises an axial stop device comprising a removable blocking device, for example a stop ring 96 of the same type as the stop ring in the first embodiment described above, and the seat 80 comprises a first annular groove 98 formed in the outer lateral surface 90. Furthermore, the spacer 110 comprises a second annular groove 112 formed in a radially inner surface 114 of the spacer (FIG. 4a). The removable blocking device 96 comprises a radially inner annular portion engaged in the first annular groove 98 and a radially outer annular portion engaged in the second annular groove 112, such that the spacer 110 and the seat 80 mutually retain each other to the first part 70.

The assembly according to the second preferred embodiment of the invention can be made by steps consisting of the following in sequence:

put the seat 80 into place in the first through orifice 74 in the first part 70; in the example illustrated on FIG. 4, this step includes insertion of the annular rim 92 into the spot facing 95;

activate the axial stop device 96; in the example illustrated, this step includes insertion of the radially inner annular portion of the stop ring 96 in the first corresponding annular groove 98; this optional stop assures that the disk 80 is "captive", in other words prevents it from accidentally getting separated during the next two steps;

fit the spacer 110 around the outer lateral surface 90 of the seat 80 such that the spacer 110 is applied in contact with the first part 70; in the example illustrated, this step includes force fitting of the radially outer annular portion of the stop ring 96 in the second annular groove 112, to guarantee that the spacer 110 is retained to the first part 70; this optional step thus makes the spacer 110 "captive", in other words prevents it from becoming accidentally detached during the next step;

install the second part 72, possibly fitted with threaded means 20, such that its contact surface 100 is applied against the spacer 110 and such that the second through orifice 76 is facing the first through orifice 74;

activate cooperation of the body 19 of the attachment means 18 with the second part 72 until application of a compression stress between parts 70 and 72 and clamping the two parts 70, 72; in the example illustrated, the screw 18 is screwed into the threaded means 20, passing it through the first through orifice 74.

The invention has been described for the case of a screwed attachment means in the form of a screw. In the case of an assembly using a rivet, an end part of the body of the rivet is capable of expanding in the radially outwards direction from the first axis. This expanded end part will be applied in contact with the second part and will cooperate with it, while applying a compression stress between the first and the second parts until they have been tightened.

The invention claimed is:

1. An assembly, for an aircraft machine, comprising:
a first part with a first through orifice;
a second part with a second through orifice facing the first through orifice in the first part; and
an attachment means that passes through said first and second through orifices, and that has a head in the shape of a countersunk head that bears on the first part and a body cooperating with the second part so that the attachment means fix the second part on the first part;
wherein the assembly further comprises a seat independent of the first and second parts and the attachment means, the seat being mounted in the first through orifice and comprising:
 a first axis, defined relative to the second part, for positioning the attachment means,
 a seat orifice in which the head of the attachment means is housed and through which the body of the attachment means extends,
 a countersunk bearing surface extending in the first through orifice and in the second through orifice, and onto which the head of the attachment means is applied, and
 abutment means applied on a periphery of the first through orifice to prevent a displacement of the seat towards the second part,
wherein:
 said seat orifice defines a second axis,
 the bearing surface is configured to centre the head of the attachment means relative to said second axis,
 the first part is spot faced, a bottom of the spot facing forming the periphery of the first through orifice, and
 the seat comprises an outer lateral surface in the shape of a cylinder of revolution, installed to fit in said first through orifice such that said first and second axes are coincident.

2. The assembly according to claim 1, wherein the attachment means is a screw, and the second part is provided with threaded means defining said first axis.

3. The assembly according to claim 1, wherein said abutment means are in the form of an annular rim extending around the seat, projecting radially outwards from it.

4. The assembly according to claim 1, also comprising an axial stop device cooperating with the seat and with the first part to retain the seat in the first through orifice.

5. The assembly according to claim 4, wherein the seat comprises a first annular groove, and the axial stop device comprises a removable locking device engaged in said first annular groove.

6. The assembly according to claim 1, wherein:
the second part has a contact surface applied in contact with the first part,
the said second through orifice comprises a widened part opening up through contact surface,
a part of the seat extends axially in said widened part of the second through orifice.

7. The assembly according to claim 1, also comprising a spacer inserted between said first and second parts and surrounding part of the seat.

8. The assembly according to claim 1, wherein the seat comprises a first annular groove, and the axial stop device comprises a removable locking device engaged in said first annular groove, wherein the assembly further comprises a spacer inserted between said first and second parts and surrounding part of the sea, and wherein the spacer comprises a second annular groove wherein said removable locking device is partially engaged, such that the spacer and the seat mutually retain each other to the first part.

9. A machine, particularly a turbine machine, comprising a least one assembly according to claim 1, wherein either the first or the second part forms at least part of an annular wall delimiting a flow channel of the machine, and the other of the first and second parts forms at least part of a structural case of the machine or a part of a conduit for the circulation of a fluid.

10. A method of making an assembly according to claim 1, comprising the following successive steps:
positioning the seat into place in the first through orifice of the first part;
positioning the second part into place, such that the second through orifice is positioned facing the first through orifice;
positioning the attachment means into place through the first and second through orifices, until a compression stress is applied between the first and the second parts and the first part and the second part are clamped to each other, due to pressure applied by the head of the attachment means on the first part and due to cooperation between the body of the attachment means and the second part.

11. The method according to claim 10, also comprising a step of activating an axial stop device such that said device cooperates with the seat and with the first part to retain the seat in the first through orifice.

* * * * *